United States Patent [19]

Fujiwara et al.

[11] Patent Number: 4,712,173

[45] Date of Patent: Dec. 8, 1987

[54] MULTICONTROL PROCESS CONTROL SYSTEM

[75] Inventors: Masatoshi Fujiwara, Yokoshuka; Masato Kuroda, Fujisawa; Tatsuhide Shiga, Zushi, all of Japan

[73] Assignee: Yamatake Honeywell, Tokyo, Japan

[21] Appl. No.: 777,987

[22] Filed: Sep. 20, 1985

[30] Foreign Application Priority Data

Oct. 1, 1984 [JP] Japan ............................ 59-204174
Oct. 9, 1984 [JP] Japan ............................ 59-210391

[51] Int. Cl.⁴ .......................................... G06F 15/46
[52] U.S. Cl. .................................. 364/138; 137/805; 91/361
[58] Field of Search ........................ 364/138; 91/361; 137/805

[56] References Cited

U.S. PATENT DOCUMENTS 3,582,621 6/1971 Lawler ............................ 364/138
4,102,248 7/1978 Martz ............................. 91/361
4,530,045 7/1985 Petroff ........................... 364/138
4,570,675 2/1986 Fenwick et al. .................. 137/805
4,573,114 2/1986 Ferguson et al. ................ 364/138

Primary Examiner—Jerry Smith
Assistant Examiner—Steve L. Hoang
Attorney, Agent, or Firm—Mitchell J. Halista; Albin Medved

[57] ABSTRACT

The present invention uses an input multiplexer for selecting a plurality of input signals, a fluid multiplexer for selectively delivering a control output to a plurality of devices to be controlled, a detecting multiplexer for selecting detected signals indicative of the condition in which the devices respond, a controller for controlling the multiplexers for successive and repeated selective operations, for effecting a controlling arithmetic operation on an input signal fed through the input multiplexer and a detected signal fed through the detecting multiplexer, and for delivering a control signal resulting from the controlling arithmetic operation, and an electro-pneumatic transducer for converting the control signal to a pneumatic pressure and issuing the pneumatic pressure as an input to the fluid multiplexer.

20 Claims, 8 Drawing Figures

MULTICONTROL PROCESS CONTROL SYSTEM

BACKGROUND OF THE INVENTION

1. Field of the Invention

The present invention relates to a positioner for use in remotely controlling a variety of scattered devices in an industrial processing apparatus, an air-conditioning apparatus, or the like.

2. Description of the Prior Art

In remotely controlling a plurality of scattered devices, it is normal practice to provide a control device for issuing an analog signal, e.g., a signal varying in the range of from 4 to 20 mA, to as many receivers or positioners as the number of devices to be controlled for receiving the signal to control the devices, e.g., controlling the opening of regulating valves, dampers, or the like dependent on the value of a current. In some cases, two positioners are connected in series to one transmission path. However, since the device to be controlled usually has a load impedance of about 600 ohms and each of the positioners usually has an input impedance of about 250 ohms, it is impractical to connect three or more positioners to the same transmission path. Each positioner effects a controlling arithmetic operation on a preset value indicated by the analog current value and an actual feedback value detected from the device as it responds to the positioner output and performs closed-loop control in order to bring the actual feedback value into conformity with the preset value. When the controlled condition of the device becomes unstable due to the relationship between the time constant of the device as it responds and the time constant of the control loop, the positioner effects an open-loop control on the device. As the number of devices to be controlled is increased, more positioners are required to be employed for association with the respective devices, resulting in an increased cost and installation space as well as an increased number of maintenance and inspection steps. Further, the switching, as required, between the closed loop control and the open loop control requires a switching circuit arrangement, the operation of which is tedious and time-consuming.

SUMMARY OF THE INVENTION

It is an object of the present invention to provide a highly effective multicontrol positioner capable of controlling a plurality of devices on a time-sharing basis and easily selecting either closed loop control or open loop control as required.

To achieve this object and other objects, the present invention includes a multicontrol positioner which includes an input multiplexer for selecting a plurality of input signals, a fluid multiplexer for selectively delivering a control output to a plurality of devices to be controlled, a detecting multiplexer for selecting detected signals indicative of the condition in which the devices respond, a controller for controlling the multiplexers for successive and repeated selective operations, for effecting a controlling arithmetic operation on an input signal fed through the input multiplexer, and for delivering a control signal resulting from the controlling arithmetic operation, and an electropneumatic transducer for converting the control signal to a pneumatic pressure and issuing the pneumatic pressure as an input to the fluid multiplexer.

BRIEF DESCRIPTION OF THE DRAWINGS

A better understanding of the present invention may be had when the following description is read in connection with the accompanying drawings, in which.

DESCRIPTION OF THE PREFERRED EMBODIMENT

The present invention is directed to an apparatus for effecting a controlling arithmetic operation on the input and detected signals, and the subsequent delivery of control control signal based on the result of the arithmetic operation in a successive manner on a time-sharing basis. Therefore, a plurality of devices can be substantially simultaneously controlled by the output of a single positioner. Further, the detected output of a pressure sensor is employed as a detected signal under the control of a selector to thereby make the positioner operate irrespective of how the device responds and to easily establish an open loop control condition, as required.

Figure 1:
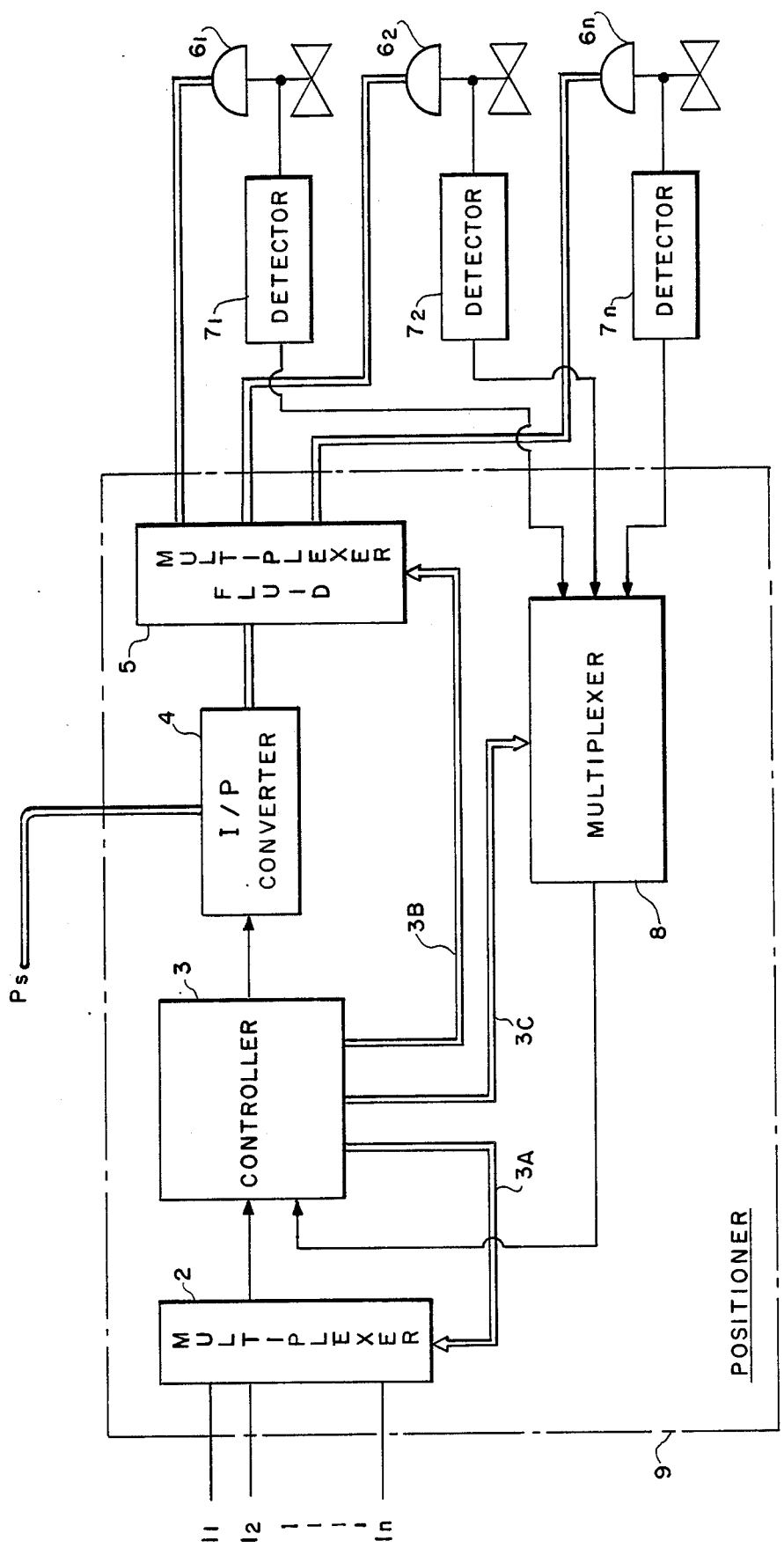
FIG. 1 is a block diagram of an example of a first embodiment of the present invention.

The present invention will hereinafter be described in detail with reference to the drawings which illustrate embodiments of the present invention. FIG. 1 is a block diagram showing a positioner g according to a first embodiment of the invention. Input signals for the positioner g are delivered from a control apparatus (not shown) through two-wire transmission paths $1_1$ through $1_n$ are selected by a first input multiplexer 2 and fed to a controller 3 composed of a processor such as a microprocessor and a memory. A control signal issued from the controller 3 is applied to an electropneumatic transducer or converter 4 which converts the control signal to a pneumatic pressure based on air under pressure supplied from an external source. The pneumatic pressure from the electropneumatic transducer 4 is delivered as a control output through a second fluid multiplexer 5 comprising a multidirectional branch valve or the like selectively to regulating valves $6_1$ through $6_n$, the opening of which is controlled by air cylinders (not shown) in response to the control output.

The regulating valves $6_1$ to $6_n$ each have a drive shaft coupled to a respective one of a plurality of response detecting means (hereinafter referred to as "detecting means") $7_1$ through $7_n$, such as potentiometers, for detecting the opening of the regulating valves $6_1$ to $6_n$ as they respond to the control output. Detected signals indicative of the valve opening and issued from the detecting means $7_1$ to $7_n$ are selected by a third detector multiplexer 8 from which the selected signal is fed to the controller 3. The controller 3 serves to control the multiplexers 2, 5, 8 via a respective one of a plurality of control buses 3A,3B,3C for successive and repeated selection of the signals, and to effect a controlling arithmetic operation on the input signal supplied via the first multiplexer 2 and the detected signal supplied via the third multiplexer 8 by a stored program as hereinafter discussed with respect to FIG. 2. For example, the controller 3 determines the difference between a preset value indicated by the input signal and an actual value indicated by the detected signal, and issues a control signal to bring the actual value into conformity with the preset value. The regulating valves $6_1$ to $6_n$ are successively and repeatedly controlled by the control signal from the controller 3 so that the openings of the regulating valves $6_1$ to $6_n$ will be controlled into the openings represented by the respective input signals. Therefore, at least three of the regulating valves $6_1$ to $6_n$ can substantially simultaneously be controlled by the single positioner 9.

Figure 2:
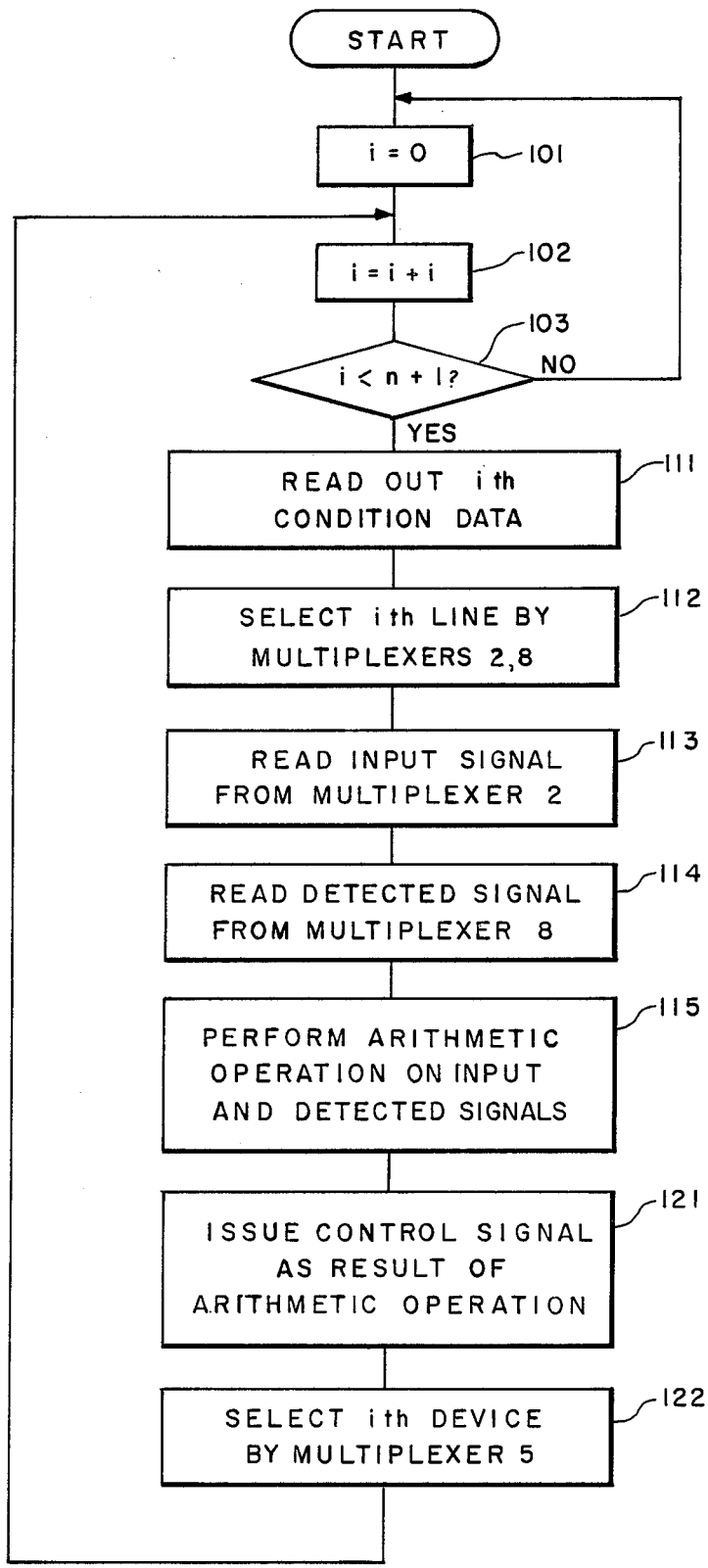
FIG. 2 is a flowchart of control operation of the system shown in FIG. 1.

FIG. 2 is a flowchart of the controlling operation effected by the microprocessor in the controller 3. A counter in the microprocessor for counting the numbers of the devices or regulating valves to be controlled is cleared (i=0) in a step 101, and is incremented (i =i+1) in a step 102. If i<n+1 in a step 103, then "ith control condition data" for the regulating valve $6_i$ is read out of a memory in a step 111 to obtain the data determined by the configuration and structure of the regulating valve $6_i$. After "i" has been selected by the multiplexers 2, 8 in a step 112, the input signal is introduced through the multiplexer 2 in a step 113 and the detected signal is read through the multiplexer 8 in a step 114. These input and detected signals and the data obtained in the step 111 are subject to a controlling arithmetic operation in a step 115.

Then, a control signal produced in the step 115 is issued in a step 121, and "i" is selected by the multiplexer 5 in a step 122. As long as the answer to the decision step 103 is YES, the steps 102 and following are repeated. When the answer to the decision step 103 is NO, then the steps 101 and following are repeated. The above operation may be effected at such a speed that the electropneumatic transducer 4 and the multiplexer 5 will operate smoothly to convert the control signal to a pneumatic pressure and to deliver the pneumatic pressure, respectively.

Figure 3:
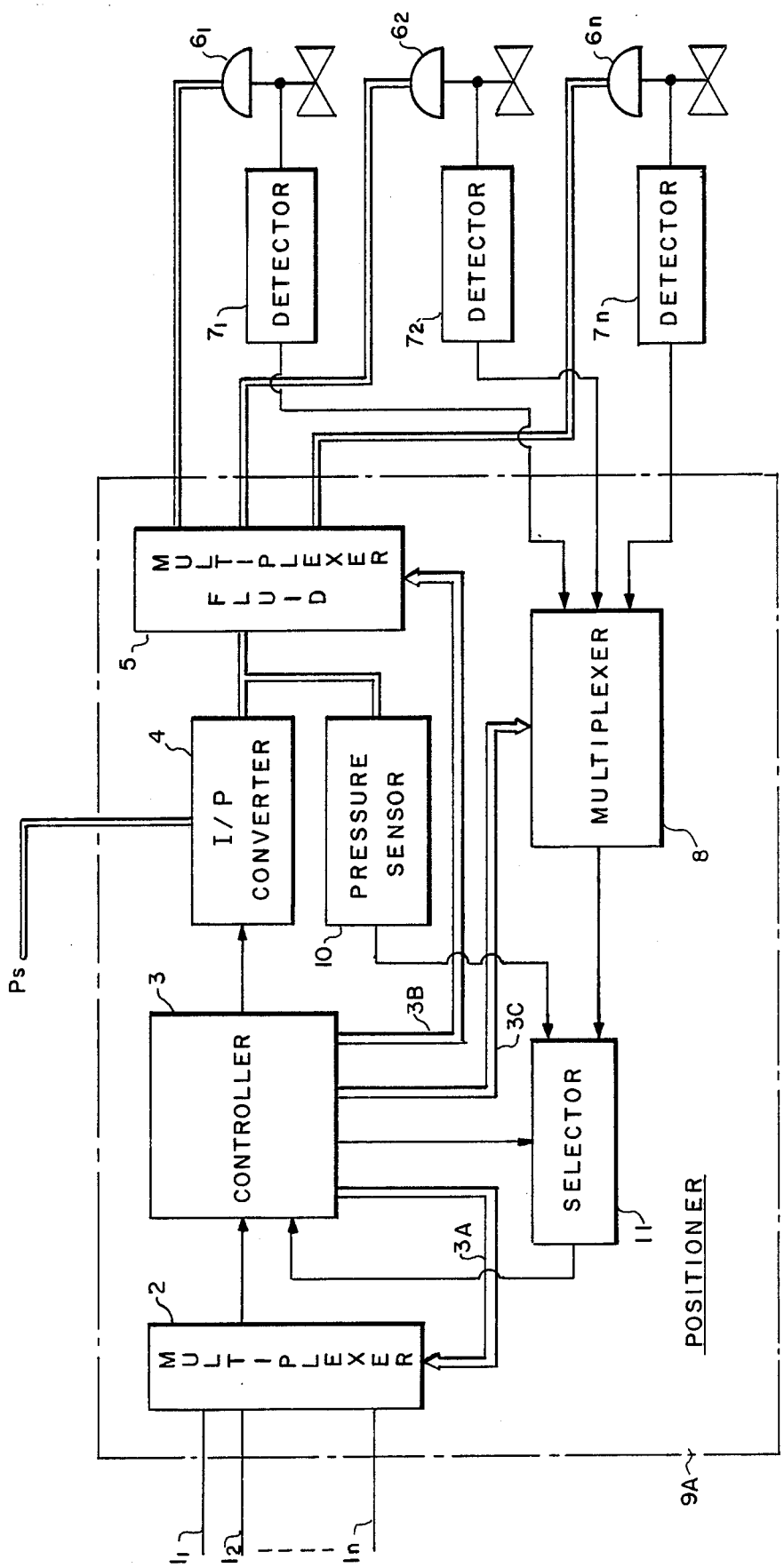
FIG. 3 is a block diagram of an example of a second embodiment of the present invention.

FIG. 3 is a block diagram of a positioner 9A according to a second embodiment of the invention which is based on the first embodiment described above. In the positioner 9A of FIG. 3, a pressure sensor 10 is connected to the output port of the electropneumatic transducer 4 for detecting the delivered pneumatic pressure and converting it to an electric signal which is supplied as a detected signal to a signal selector 11. Normally, the selector 11 selects the output of the multiplexer 8. However, the selector 11 can be controlled by the controller 3 to select the output of the pressure sensor 10 and to apply the detected signal therefrom to the controller 3.

Therefore, at least three of the regulating valves $6_1$ through $6_n$ can be substantially simultaneously controlled by the single positioner 11. When the multiplexer 8 is selected by the selector 9, the entire system is in a closed loop control including the feedback from the regulating valves $6_1$ to $6_n$ as they respond to the control signal. When the pressure sensor 10 is selected by the selector 9, the system is in an open loop control excluding the feedback from the regulating valves $6_1$ through $6_n$ as they respond to the control signal. Under the open loop control, there is a local closed loop through the electropneumatic transducer 4 and the pressure sensor 10 for making the pneumatic pressure from the electropneumatic transducer 4 dependent on the control signal.

Figure 4:
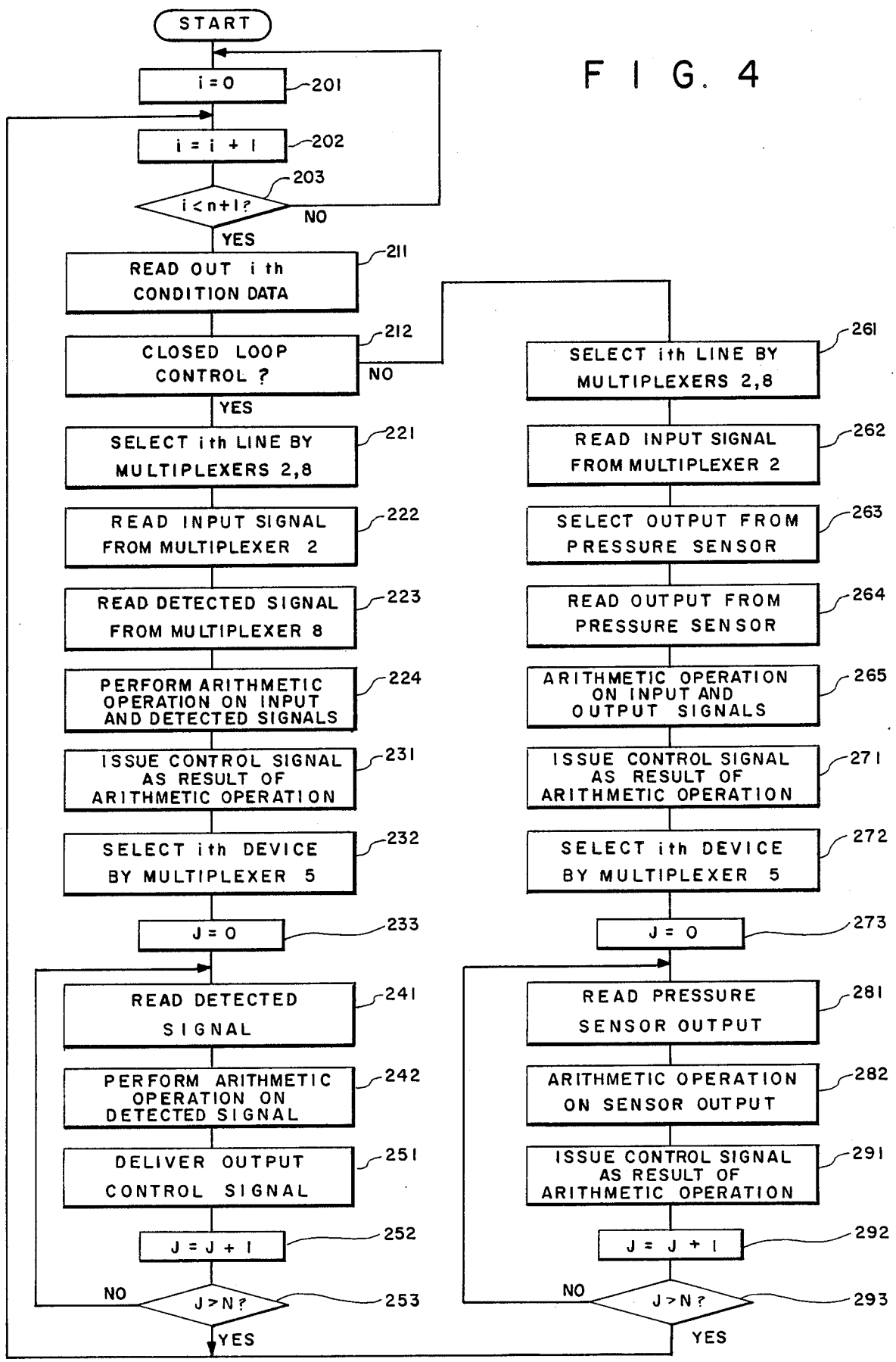
FIG. 4 is a flowchart of control operation of the system shown in FIG. 3.

FIG. 4 is a flowchart of the controlling operation effected by the processor in the controller 3. A counter in the processor for counting the numbers of the devices or regulating valves to be controlled is cleared (i=0) in a step 201, and is incremented (i=i+1) in a step 202. If i<n +1 in a step 203, then "ith control condition data" for the regulating valve $6_i$ is read out of a memory in a step 211 to obtain the data determined by the configuration and structure of the regulating valve $6_i$. A step 212 ascertains whether the regulating valve $6_1$ is under closed loop control based on the data in the memory. If the regulating valve $6_1$ is under closed loop control, then "i" is selected by the multiplexers 2, 8 in a step 221. Thereafter the input signal is introduced through the multiplexer 2 in step 222 and the detected signal is read through the multiplexer 8 in a step 223. These input and detected signals and the data obtained in the step 211 are subject to a controlling arithmetic operation in a step 224.

Then, a control signal produced in the step 224 is issued in a step 231, and "i" is selected by the multiplexer 5 in a step 232. A counter in the processor for counting the times in which the steps 223 through 231 are repeated is cleared (j=0) in a step 233. Then, the detected signal is introduced in a step 241, and a controlling arithmetic operation is effected in a step 242 employing the detected signal, followed by the delivery of the control signal in a step 251. The counter is then incremented (j=j+1) in a step 252. The count j and a prescribed number N are compared (j>N ?) in a step 253. If the answer to the step 253 is NO, then the steps 241 and those following are repeated. If the answer to the step 253 is YES, then the steps 202 and those following are repeated.

If the answer to the decision step 212 is NO, then "i" is selected by the multiplexer 2 in a step 261. The input signal is introduced via the multiplexer 2 in a step 262, and the output of the pressure sensor 10 is selected by the selector 9 in a step 263. Then, the output from the pressure sensor 10 is introduced in a step 264. These input and output signals and the data obtained in the step 211 are subject to a controlling arithmetic operation in a step 265. The control signal produced in the step 265 is delivered in a step 271, and "i" is selected by the multiplexer 5 in a step 272. The counter is cleared (j=0) in a step 273.

Then, the sensor output is introduced in a step 281, and a controlling arithmetic operation utilizing the sensor output is effected in a step 282, followed by the delivery of the control signal in a step 291. The counter is incremented (j=J+1) in a step 292. The count j and a prescribed number N are compared (j>N?) in a step 293. If the answer to the step 293 is NO, then the steps 281 and those following are repeated. If the answer to the step 293 is YES, then the program returns to the step 202.

By repeating the steps 241 through 251 and the steps 281 through 291, the transient condition is progressively stabilized. In the step 264, the control condition is quickly stabilized since the pneumatic pressure delivered to the previously controlled regulating valve $6_{i-1}$ is utilized. The above operation may be effected at such a speed that the electropneumatic transducer 4 and the multiplexer 5 will operate smoothly to convert the control signal to a pneumatic pressure and to deliver the pneumatic pressure, respectively.

Figure 5:
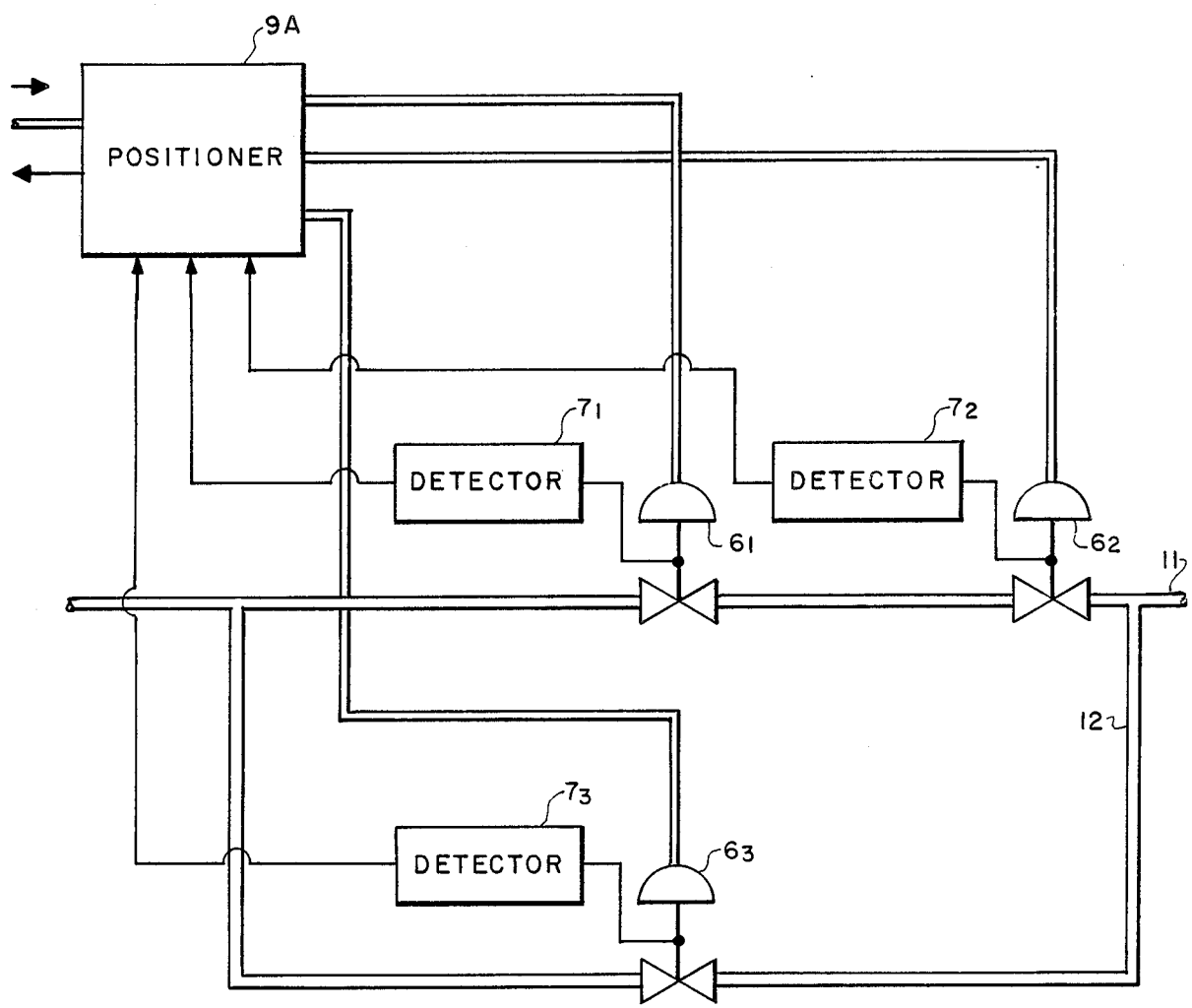
FIGS. 5 and 6 are views showing arrangements in which regulating valves are connected in series and parallel to each other, respectively.

FIG. 5 is illustrative of some of the devices to be controlled, e.g., a plurality of regulating valves $6_1$, $6_2$ inserted in series in one flow path and a plurality of regulating valves $6_1$, $6_3$ inserted parallel to each other with respect to the flow path. More specifically, main and auxiliary valves $6_1$, $6_2$ are inserted in series in a main pipe 11, and an auxiliary valve 63 is inserted in an auxiliary pipe 12 bypassing the valves $6_1$, $6_2$. Under normal conditions, the auxiliary valve $6_2$ is fully open, and the auxiliary valve $6_3$ is fully closed, while only the main valve $6_1$ is used for flow control. When the flow rate is excessively large even if the main valve $6_1$ is closed, then it is backed up by the auxiliary valve $6_2$ which is closed. When the flow rate is excessively small even if the main valve $6_1$ is opened, then it is backed up by the auxiliary valve $6_3$ which is opened. The flow rate is detected by a flowmeter (not shown), and a backup command is delivered from the control apparatus through one of the transmission paths $1_1$ through $1_n$ which is selected by the detected output from the flowmeter.

Figure 6:
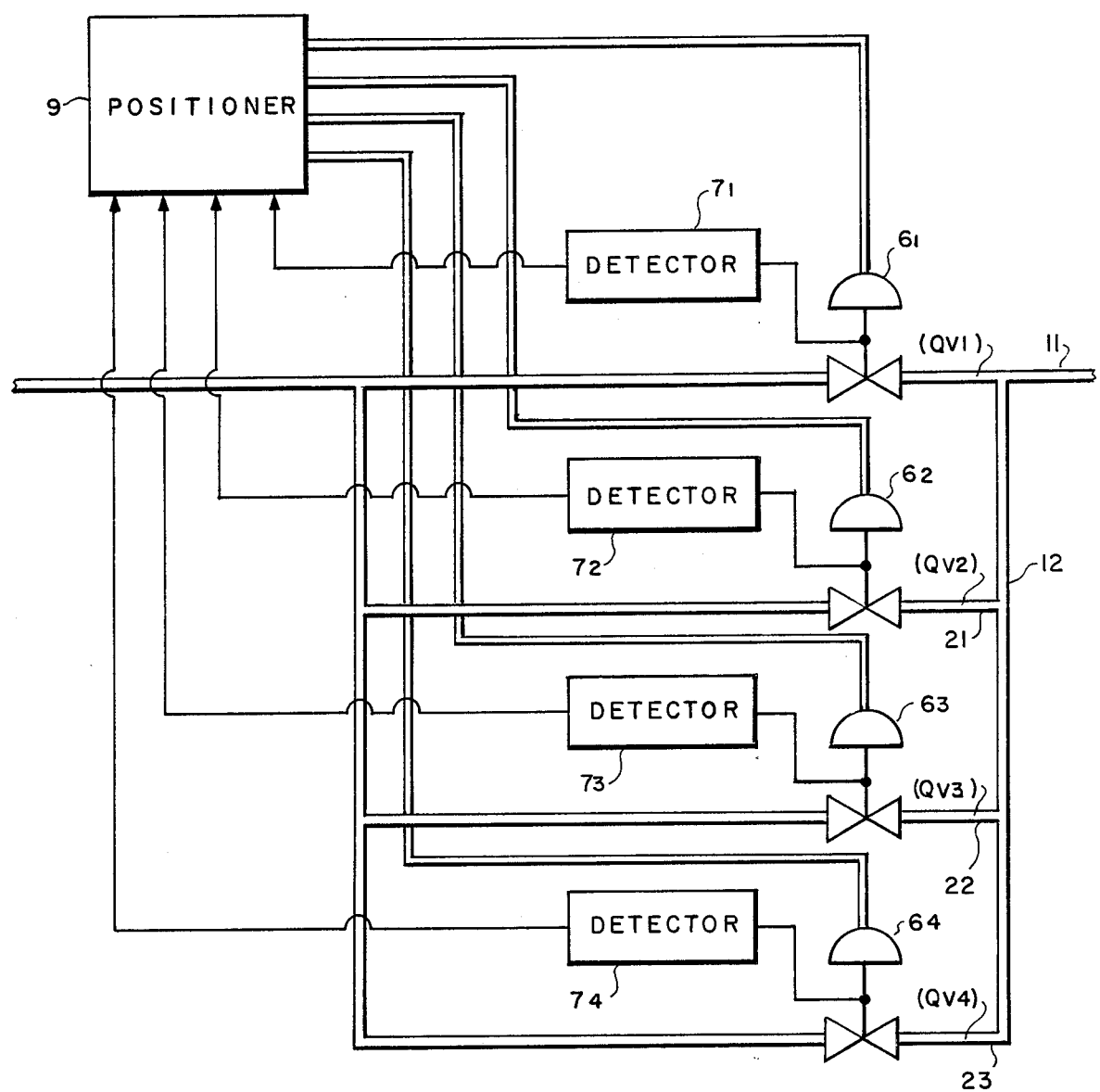

FIG. 6 shows the manner in which some of the devices to be controlled or regulating valves are controlled in a system known as a multisplit range. The regulating valves $6_1$ to $6_4$ are inserted in parallel to each other in a main pipe 11 and branch pipes 21 through 23, respectively, which are branched from an auxiliary pipe 12 bypassing the main pipe 11.

Figure 7:
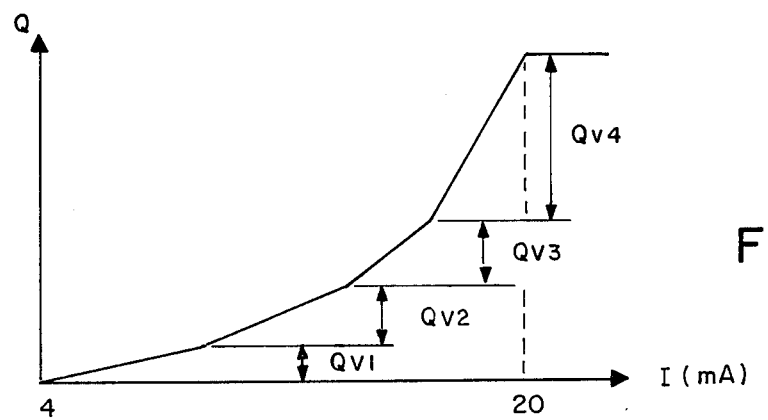
FIG. 7 is an operating diagram showing the manner in which a flow rate is controlled by the arrangement of FIG. 6.

FIG. 7 shows the operative relationship between an input signal I and a flow rate in FIG. 6. Since the reulating valve is generally stable in its flow rate controlling characteristics in the vicinity of half of the valve opening the flow rate range $Q_{V1}$ is controlled solely by the regulating valve $6_1$ when the current value of the input signal I is in a small range. As the current value of the input signal I is increased, the regulating valves $6_2$ to $6_4$ are successively opened to control the flow rate ranges $Q_{V2}$ through $Q_{V4}$. Therefore, the entire flow rate control characteristics is rendered smooth by an incremental step approximation. The multisplit range may be applied to the main valve $6_1$ and the auxiliary valve $6_3$ shown in FIG. 5. According to this embodiment of the present invention, only those regulating valves shown in FIGS. 5 and 6 may be all devices to be controlled. Thus, only one input signal is enough, and the multiplexer 2 may be dispensed with.

Figure 8:
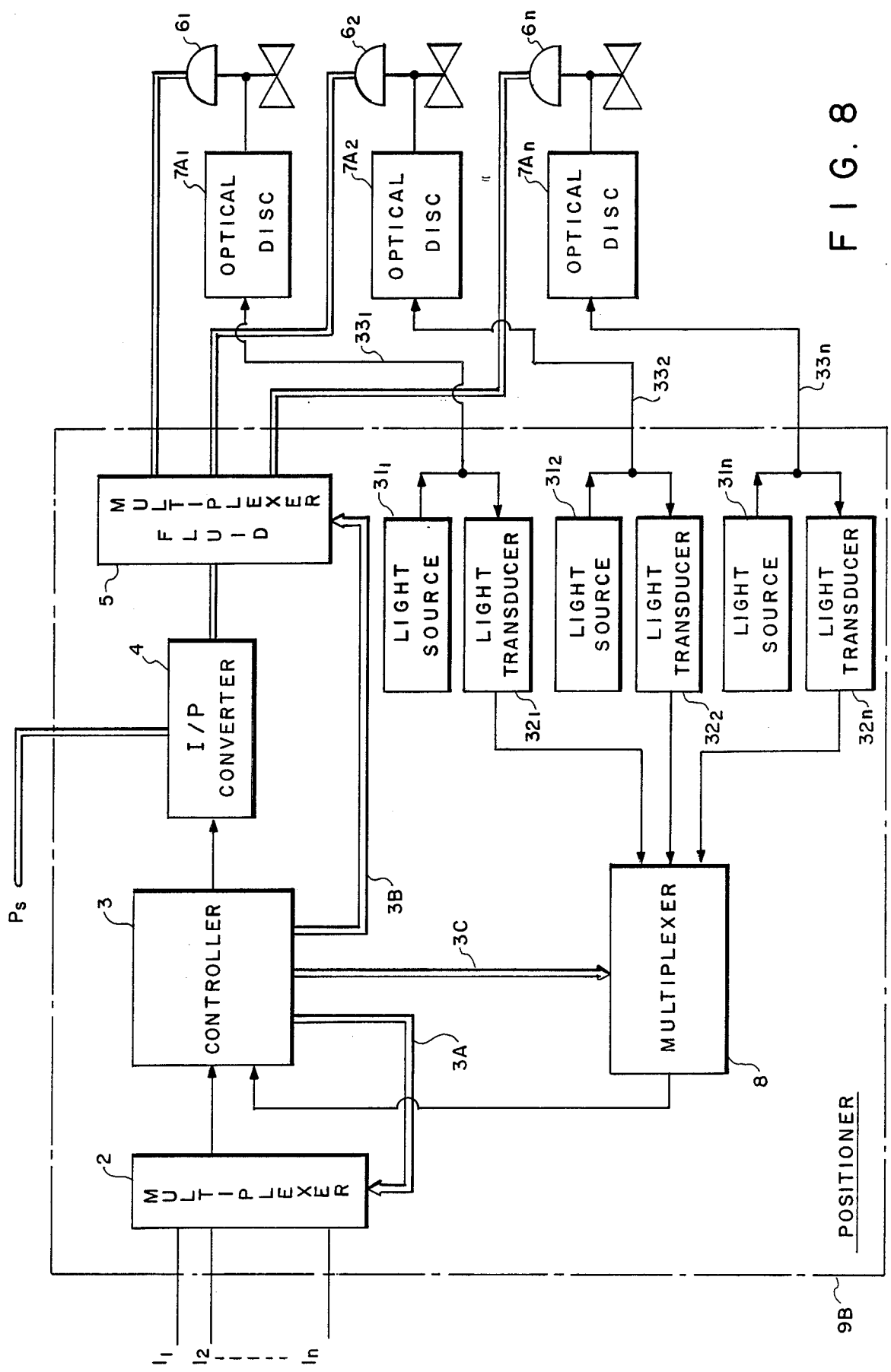
FIG. 8 is a block diagram of an example of a third embodiment of the present invention.

FIG. 8 shows in block form a positioner 9B according to a third embodiment of the present invention. In the positioner shown in FIG. 8, light sources $31_1$ through $31_n$ in the form of light-emitting diodes, lamps or the like, and photoelectric transducers $32_1$ through $32_n$ comprising phototransistors or the like are added to the arrangement shown in FIG. 1. The detecting means $7A_1$ through $7A_n$ comprise optical rotary disc encoders which are connected to the light sources $31_1$ through $31_n$ and the photoelectric transducers $32_1$ through $32_n$ by means of light transmission paths $33_1$ through $33_n$ each comprising a single optical fiber or a plurality of optical fibers.

The light rays emitted from the light sources $31_1$ through $31_n$ are delivered through the light transmission paths $33_1$ through $33_n$ to the detecting means $7_1$ through $7_n$. The light rays are then radiated onto respective ones of the rotatable discs which have coded or intermittent through holes and are connected to the drive shafts of the regulating valves $6_1$ through $6_n$. The light rays having passed through the rotatable discs are then fed as light signals in the form of codes composed of a plurality of bits or successive pulses via the light transmission paths $33_1$ through $33_n$ to the photoelectric transducers $32_1$ through $32_n$. The photoelectric transducers $32_1$ through $32_n$ produce detected signals indicative of the detected openings of the regulating valves $6_1$ through $6_n$ and applied to the multiplexer 8.

As a consequence, at least three regulating valves $6_1$ to $6_n$ can be substantially simultaneously controlled by the single positioner 9B. Further, the positioner 9B, the regulating valves $6_1$ to $6_n$, and the detecting means $7_1$ through $7_n$ are interconnected only by the pneumatic pressure and light rays rather than by electrical wires carrying electrical currents. Accordingly, any sparks which would result from the intermittent delivery of the currents or any heating effects due to current leakage are eliminated. Thus where a flammable gas or liquid is present in the pipes of the regulating valves $6_1$ to $6_n$ or in the vicinity thereof, the system shown in FIG. 8 provides an intrinsically safe operation.

The regulating valves shown in FIGS. 5 and 6 may be some or all of the devices to be controlled. Where the regulating valves of FIGS. 5 and 6 are all of the devices to be controlled, the multiplexer 2 may be dispensed with. By positioning the single positioner in the vicinity of the place where the regulating valves $6_1$ to $6_n$ are installed, the regulating valves $6_1$ to $6_n$ can freely be controlled. Therefore, the number of positioners required is reduced, the cost and installation space are reduced as well as the number of steps of maintenance and inspection.

The controller 3 may be composed of a combination of various logic circuits rather than a single microprocessor, and the multiplexer 5 may comprise a combination of solenoid-operated valves or the like. In FIG. 1, the detecting means $7_1$ through $7_n$ may comprise various electromagnetic or photoelectric pulse generators or rotary encoders. The devices to be controlled in FIGS. 1 and 6 may be dampers, shutters, gates, and other devices, in addition to the regulating valves $6_1$ to $6_n$, and the input signals may be applied in various forms selected dependent on the conditions of the devices to be controlled.

Accordingly, it may be seen that there has been provided, in accordance with the present invention, a system whereby a plurality of devices are controlled by a single positioner on a time-sharing basis. Since the positioner is shared by the devices, the number of positioners required is reduced, the cost and installation space are reduced, as well as the number of steps of maintenance and inspection, resulting in a highly economical arrangement. Further, the open loop control can easily be selected dependent on the conditions or the devices to be controlled.

The embodiments of the present invention 1n which an exclusive property or privilege is claimed are defined as follows:

1. A multicontrol system comprising
    an input multiplexer for selecting a plurality of input signals, a detecting multiplexer for selecting detected signals indicative of the condition in which a plurality of devices respond,
    an output multiplexer for selectively delivering a control output to the plurality of devices to be controlled and
        a controller for controlling the multiplexers for successive and repeated selective operation, for effecting a controlling arithmetic operation on an input signal fed through said input multiplexer and a detected signal fed through said detecting multiplexer, and for delivering a control signal resulting from said controlling arithmetic operation as an input to said output multiplexer.

2. A multicontrol system according to claim 1, wherein said devices to be controlled partly comprise a plurality of regulating valves inserted in series in one flow path.

3. A multicontrol system according to claim 1, wherein said devices to be controlled partly comprise a plurality of regulating valves inserted in parallel in one flow path.

4. A multicontrol system as set forth in claim 1 wherein said output multiplexer includes a fluid multiplexer and an electropneumatic transducer for converting said control signal to a pneumatic pressure and issuing said pressure as an input to said fluid multiplexer.

5. A multicontrol system comprising
a multiplexer for selectively delivering a control output to a plurality of devices to be controlled,
a detecting multiplexer for selecting detected signals indicative of the condition in which said devices respond,
a controller for controlling the multiplexers for successive and repeated selective operation, for effecting a controlling arithmetic operation on an input signal and a detected signal fed through said detecting multiplexer, and for delivering a control signal resulting from said controlling arithmetic operation, and
an electropneumatic transducer for converting said control signal to a pneumatic pressure and issuing said pneumatic pressure as an input to said fluid multiplexer.

6. A multicontrol system according to claim 5 wherein said devices to be controlled comprise a plurality of regulating valves inserted in series in one flow path.

7. A multicontrol system according to claim 5, wherein said devices to be controlled comprise a plurality of regulating valves inserted in parallel in one flow path.

8. A multicontrol system comprising
an input multiplexer for selecting a plurality of input signals,
an output multiplexer for selectively delivering a control output to a plurality of devices to be controlled,
a light source for delivering detecting light rays through light transmission paths to response detecting means for detecting the condition in which said devices respond,
photoelectric transducers associated respectively with said devices for converting to electric signal light signals passed through said light transmission paths and indicating detected values from said response detecting means to electric signals based on said light rays,
a detecting multiplexer for selecting the outputs from said photoelectric transducers; and
a controller for controlling the multiplexers for successive and repeated selective operation, for effecting a controlling arithmetic operation on an input signal fed through said input multiplexer and a detected signal fed through said detecting multiplexer, and for delivering a control signal resulting from said controlling arithmetic operations as an input signal to said output multiplexer.

9. A multicontrol system according to claim 8, wherein said devices to be controled partly comprise a plurality of regulating valves iserted in series in one flow path.

10. A multicontrol system according to claim 8, wherein said devices to be controlled partly comprise a plurality of regulating valves inserted in parallel in one flow path.

11. A multicontrol system as set forth in claim 8, wherein said output multiplexer includes a fluid multiplexer and an electropneumatic transducer for converting said control signal to a pneumatic pressure and issuing said pressure as an input to said fluid multiplexer.

12. A multicontrol system comprising
a fluid multiplexer for selectively delivering a control output to a plurality of devices to be controlled,
a light source for delivering detecting light rays through light transmission paths to response detecting means for detecting the condition in which said devices respond,
photoelectric transducers associated respectively with said devices for converting to electric signals light signals passed through said light transmission paths and indicating detected values from said response detecting means based on said light rays,
a detecting multiplexer for selecting the outputs from said photoelectric transducers,
a controller for controlling the multiplexers for successive and repeated selective operation, for effecting a controlling arithmetic operation on an input signal and a detected signal fed through said detecting multiplexer, and for delivering a control signal resulting from said controlling arithmetic operation, and
an electropneumatic transducer for converting said control signal to a pneumatic pressure and issuing said pneumatic pressure as an input to said fluid multiplexer.

13. A multicontrol system according to claim 12, wherein said devices to be controlled comprise a plurality of regulating valves inserted in series in one flow path.

14. A multicontrol system according to claim 12, wherein said devices to be controlled comprise a plurality of regulating valves inserted in parallel in one flow path.

15. A multicontrol system comprising
an input multiplexer for selecting a plurality of input signals,
a fluid multiplexer for selectively delivering a control output to a plurality of devices to be controlled,
a detecting multiplexer for selecting detected signals indicative of the condition in which said devices respond,
an electropneumatic transducer for converting a control signal to a pneumatic pressure and delivering said pneumatic pressure to said fluid multiplexer,
a pressure sensor for detecting the pneumatic pressure delivered from said electropneumatic transducer as an electric signal,
a selector for selecting the output from said detecting multiplexer and the output from said pressure sensor, and
a controller for controlling the multiplexers for successive and repeated selective operation and enabling said selector to select the output as required, for effecting a controlling arithmetic operation on an input signal fed through said input multiplexer and a detected signal fed through said selector, and for delivering said control signal resulting from said controlling aithmetic operation as an input to said electropneumatic transducer.

16. A multicontrol system according to claim 15, wherein said devices to be controlled partly comprise a plurality of regulating valves inserted in series in one flow path.

17. A multicontrol system according to claim 15, wherein said devices to be controlled partly comprise a plurality of regulating valves inserted in parallel in one flow path.

18. A multicontrol system comprising
   a fluid multiplexer for seletively delivering a control output to a plurality of devices to be controlled,
   a detecting multiplexer for selecting detected signals indicative of the condition in wnich said devices respond,
   an electropneumatic transducer for converting a control signal to a pneumatic pressure and delivering said pneumatic pressure to said fluid multiplexer,
   a pressure sensor for detectig the pneumatic pressure delivered from said electropneumatic transducer as an electric signal,
   a selector for selecting the output from said detecting multiplexer and the output from said pressure sensor and
   a controller for controlling the multiplexers for successive and repeated selective operation and enabling said selector to select the output, for effecting a controlling arithmetic operation on an input signal and a detected signal fed through said selector, and for delivering said control signal resulting from said controlling arithmetic operation as an input to said electropneumatic transducer.

19. A multicontrol system according to claim 18, wherein said devices to be controlled comprise a plurality of regulating valves inserted in series in one flow path.

20. A multicontrol system according to claim 18, wherein said devices to be controlled comprise a plurality of regulating valves inserted in parallel in one flow path.

* * * * *